US012009611B2

(12) United States Patent
Lin

(10) Patent No.: US 12,009,611 B2
(45) Date of Patent: Jun. 11, 2024

(54) SECUREMENT OF A SHELL TO AN INSULATOR BODY

(71) Applicant: P-TWO INDUSTRIES INC., Taoyuan (TW)

(72) Inventor: Hsien-Chang Lin, Taoyuan (TW)

(73) Assignee: P-TWO INDUSTRIES INC., Taoyuan (TW)

(*) Notice: Subject to any disclaimer, the term of this patent is extended or adjusted under 35 U.S.C. 154(b) by 0 days.

(21) Appl. No.: 17/725,477

(22) Filed: Apr. 20, 2022

(65) Prior Publication Data

US 2023/0074043 A1 Mar. 9, 2023

(30) Foreign Application Priority Data

Sep. 6, 2021 (TW) ................................ 110133237
Jan. 25, 2022 (TW) ................................ 111300382

(51) Int. Cl.

*H01R 12/59* (2011.01)
*H01R 12/61* (2011.01)
*H01R 12/67* (2011.01)
*H01R 12/70* (2011.01)

(52) U.S. Cl.

CPC ......... *H01R 12/592* (2013.01); *H01R 12/616* (2013.01); *H01R 12/675* (2013.01); *H01R 12/7023* (2013.01); *H01R 12/7064* (2013.01)

(58) Field of Classification Search

CPC .. H01R 12/592; H01R 12/616; H01R 12/675; H01R 12/7023; H01R 12/7064
See application file for complete search history.

(56) References Cited

U.S. PATENT DOCUMENTS 6,821,158 B2 * 11/2004 Iida ........................ H01R 12/79 439/492
7,189,105 B2 * 3/2007 Takaku ................ H01R 12/592 439/98

* cited by examiner

*Primary Examiner* — Anessa Girardi
(74) *Attorney, Agent, or Firm* — Muncy, Geissler, Olds & Lowe, P.C.

(57) ABSTRACT

A thin type lock and unlock connector include a first shell, a second shell and a first insulator, which are buckled and combined with each other by the respective provided first fixing members to form a connector that can be connected to a flexible printed circuit board. The second shell provides a first locking member and a first elastic member to lock the flexible printed circuit board to the connector. When an external force is applied to the first pressing part of the first shell, it acts on the locking member to unlock the flexible printed circuit board that the flexible printed circuit board can be detached from the connector. The first insulator provides an action portion with a slope to be arranged corresponding to the first locking member, to determine the deformation stroke of the first locking member.

13 Claims, 12 Drawing Sheets

SECUREMENT OF A SHELL TO AN INSULATOR BODY

FIELD OF THE INVENTION

The present invention relates to fields of a connector, and more particularly, to a thin type lock and unlock connector.

BACKGROUND OF THE INVENTION

Generally, a wire to board connector provides a flexible printed circuit board (FPC) and a printed circuit board (PCB) with a plurality of leading end/trailing end electrode connecting.

In order to enable the connector to be used in application fields requiring a narrower space, such as the automotive field or the application field of thin electronic products, the person skilled in the art of the present invention has considered how to make thin connectors to match the aforementioned application fields. In addition to making the thin connectors, also to consider whether automatic locking and manual unlocking functions are capable of being provided in the process of thinning connectors.

In view of this, a thin type lock and unlock connector is provided in the present invention, in order to solve an issue that cannot be solved by the prior art.

SUMMARY OF THE INVENTION

A first objective of the present invention is to provide a thin type lock and unlock connector, such that it is capable of being used for connecting with a flexible printed circuit board, and while is capable of achieving an objective for automotive locking and manual unlocking.

A second objective of the present invention is, according to the thin type lock and unlock connector as mentioned above, providing a three members structure with a first shell, a second shell and a first insulator. A connector connecting with the flexible printed circuit board is formed through a fixing member provided by the first shell, the second shell and the first insulator further buckled and combined with each other.

A third objective of the present invention provides a thin type lock and unlock connector providing a two members structure with a fifth shell and a second insulator. A connector connecting with the flexible printed circuit board is formed through a fixing member provided by the fifth shell and the second insulator further buckled and combined with each other.

A fourth objective of the present invention is, according to the thin type lock and unlock connector as mentioned above, providing a first pressing part of the first shell for intermediately pressing a second pressing part of the second shell so as to achieve an objective for unlocking, or providing a fifth pressing part for directly pressing the fifth shell so as to achieve an objective for unlocking.

A fifth objective of the present invention is, according to the thin type lock and unlock connector as mentioned above, providing an action portion with a first slope (or called a second slope) so as to be disposed corresponding to a first locking member (or a second locking member) of the second shell (or called a fifth shell), so as to achieve an objective for determining a deformation stroke of the first locking member (or the second locking member) through the first slope (or called the second slope).

In order to achieve the objectives mentioned above and the other objective, the present invention provides a thin type lock and unlock connector being capable of connecting the flexible printed circuit board. The thin type lock and unlock connector comprises a first shell, a second shell and a first insulator. The first shell comprises a first body, a plurality of first pressing parts and a plurality of first fixing portions. The plurality of first pressing parts and the plurality of first fixing portions are respectively arranged on both sides of the first body. The plurality of first pressing parts connect with the plurality of first fixing portions and the first body. The plurality of first fixing portions respectively provide a first fixing member, a third fixing member and a fifth fixing member. The first fixing member extends forward a direction of the first body, and the third fixing member extends far away a direction of the first body. The second shell comprises a second body, a plurality of second pressing parts and a plurality of second fixing members. The plurality of second pressing parts and the plurality of second fixing members are respectively arranged on both sides of the second body. The plurality of second pressing parts connect with the plurality of second fixing members and the second body. The plurality of second pressing parts are disposed corresponding to the plurality of first pressing parts. The plurality of second pressing parts provide a first locking member and a first elastic member. The plurality of second fixing members connect with the plurality of first elastic members and the plurality of second fixing members are disposed corresponding to the plurality of first fixing members. The first insulator comprises a third body, a plurality of first action portions and a plurality of sixth fixing members. The third body is provided corresponding to a first surface, a second surface and a first accommodating space. The first surface combines with the first shell, and the second surface combines with the second shell. The plurality of first action portions and the plurality of sixth fixing members are respectively arranged on both sides of the third body. The plurality of first action portions are disposed corresponding to the plurality of first locking members, and the first accommodating space accommodates a portion of the plurality of first locking members. The plurality of first action portions respectively form a first slope to determine a deformation stroke of the plurality of first locking members, such that the plurality of first locking members are stopped by the first slope, furthermore the plurality of sixth fixing members are corresponding to the plurality of fifth fixing members. Wherein, through a combination between the plurality of first fixing members, the plurality of second fixing members, the plurality of fifth fixing members, the plurality of sixth fixing members and the plurality of first elastic members, such that the first shell, the second shell and the first insulator buckles and combines with each other, Furthermore, after the plurality of first pressing parts are suffered an external force to deform forward a first direction deformation, the plurality of first elastic members are suffered from a deformation of the plurality of first pressing parts, so as to further drive the plurality of first locking members to deform forward a second direction such that the flexible printed circuit board located in the first accommodating space is capable of being unlocked, and when a deformation of the plurality of first elastic members do not occur, the plurality of first locking members lock the flexible printed circuit board in the first accommodating space.

In order to achieve the objective mentioned above and the other objective, the present invention provides a thin type lock and unlock connector being capable of connecting a flexible printed circuit board. A thin type lock and unlock connector comprises a fifth shell and a second insulator. The fifth shell comprises a fifth body, a plurality of fifth pressing parts, a plurality of ninth fixing members, a plurality of eleventh fixing members and a plurality of thirteenth fixing members. The plurality of fifth pressing parts and the plurality of ninth fixing members are arranged on both sides of the fifth body. The plurality of eleventh fixing members are disposed on a leading edge of the fifth body, and the plurality of thirteenth fixing members are disposed on a trailing edge of the fifth body, the plurality of fifth pressing parts connect with the plurality of ninth fixing members and the fifth body. The plurality of fifth pressing parts provide a second locking member and a second elastic member. The plurality of ninth fixing members connect with the plurality of second elastic members. The second insulator comprises a seventh body, a plurality of second action portions, a plurality of fourth openings, a plurality of twelfth fixing members and a plurality of fourteenth fixing members. The seventh body provides a second accommodating space. The plurality of second action portions are arranged on both sides of the seventh body. The plurality of second action portions are disposed corresponding to the plurality of second locking members, and a portion of the plurality of second locking members are accommodated in the second accommodating space. The plurality of second action portions respectively form the second slope so as to determine a deformation stroke of the plurality of second locking members, such that the plurality of second locking members are stopped by the second slope. The plurality of fourth openings are disposed corresponding to the plurality of ninth fixing members. The plurality of twelfth fixing members are disposed corresponding to the plurality of eleventh fixing members. The plurality of fourteenth fixing members are disposed corresponding to the plurality of thirteenth fixing members. Wherein, through a combination between the plurality of ninth fixing members, the plurality of eleventh fixing members, the plurality of thirteenth fixing members, the plurality of fourth openings, the plurality of twelfth fixing members and the plurality of fourteenth fixing members, such that the fifth shell and the second insulator are buckled and combined with each other. Furthermore the plurality of fifth pressing parts are suffered from an external force thereby after a first direction deformation, the plurality of second elastic members are suffered from a deformation of the plurality of fifth pressing parts, such that the plurality of second locking members are further dived forward a second direction of a deformation, so as to the flexible printed circuit board located in the second accommodating space is unlocked, and when a deformation of the plurality of second elastic members are not occurred, the plurality of second locking members lock the flexible printed circuit board in the second accommodating space.

Comparing to a common thin type lock and unlock connector, the present invention provides a thin type lock and unlock connector can be applied to the flexible printed circuit board, and the thin type lock and unlock connector is not only capable of thinning the thickness, but also performs the locking and unlocking.

BRIEF DESCRIPTION OF THE DRAWINGS

FIG. 3(*b*) illustrates a top view of the first shell in FIG. 2 of the present invention.

FIG. 3(*c*) illustrates a side view of the first shell in FIG. 2 of the present invention.

FIG. 4(*b*) illustrates a top view of the second shell in FIG. 2 of the present invention.

FIG. 4(*c*) illustrates a side view of the second shell in FIG. 2 of the present invention.

FIG. 5(*b*) illustrates a top view of the first insulator in FIG. 2 of the present invention.

FIG. 5(*c*) illustrates a front view of the first insulator in FIG. 2 of the present invention.

FIG. 5(*d*) illustrates a side view of the first insulator in FIG. 2 of the present invention.

FIG. 9(*b*) illustrates a top view of the fifth shell in FIG. 8 of the present invention.

FIG. 9(*c*) illustrates a side view of the fifth shell in FIG. 8 of the present invention.

FIG. 10(*b*) illustrates a bottom view of the second insulator in FIG. 8 of the present invention.

FIG. 10(*c*) illustrates a front view of second insulator in FIG. 8 of the present invention.

FIG. 10(*d*) illustrates a side view of second insulator in FIG. 8 of the present invention.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

The description of unit, element and component in the present invention uses "one", "a", or "an". The way mentioned above is for convenience, and for general meaning of the category of the present invention. Therefore, the description should be understood as "include one", "at least one", and include the singular and plural forms at the same time unless obvious meaning.

The description of comprise, have, include, contain, or another similar semantics has the non-exclusive meaning. For example, an element, structure, product, or device contain multi requirements are not limited in the list of the content, but include another inherent requirement of element, structure, product or device not explicitly listed in the content. In addition, the term "or" is inclusive meaning, and not exclusive meaning.

Figure 1:
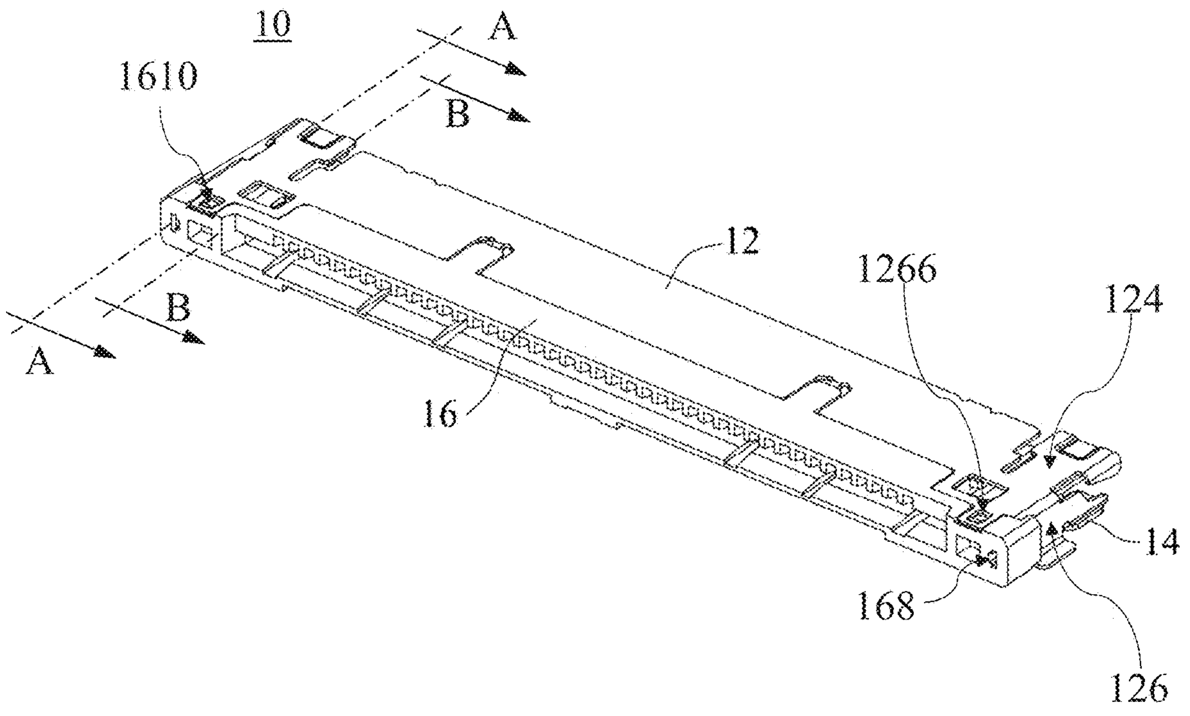
FIG. 1 shows a perspective schematic view of a thin type lock and unlock connector of a first embodiment of the present invention.

FIG. 1 shows a perspective schematic view of a thin type lock and unlock connector of a first embodiment of the present invention. In FIG. 1, thin type lock and unlock connector 10 can connects with a flexible printed circuit board (FIG. 1 not shown).

Figure 2:
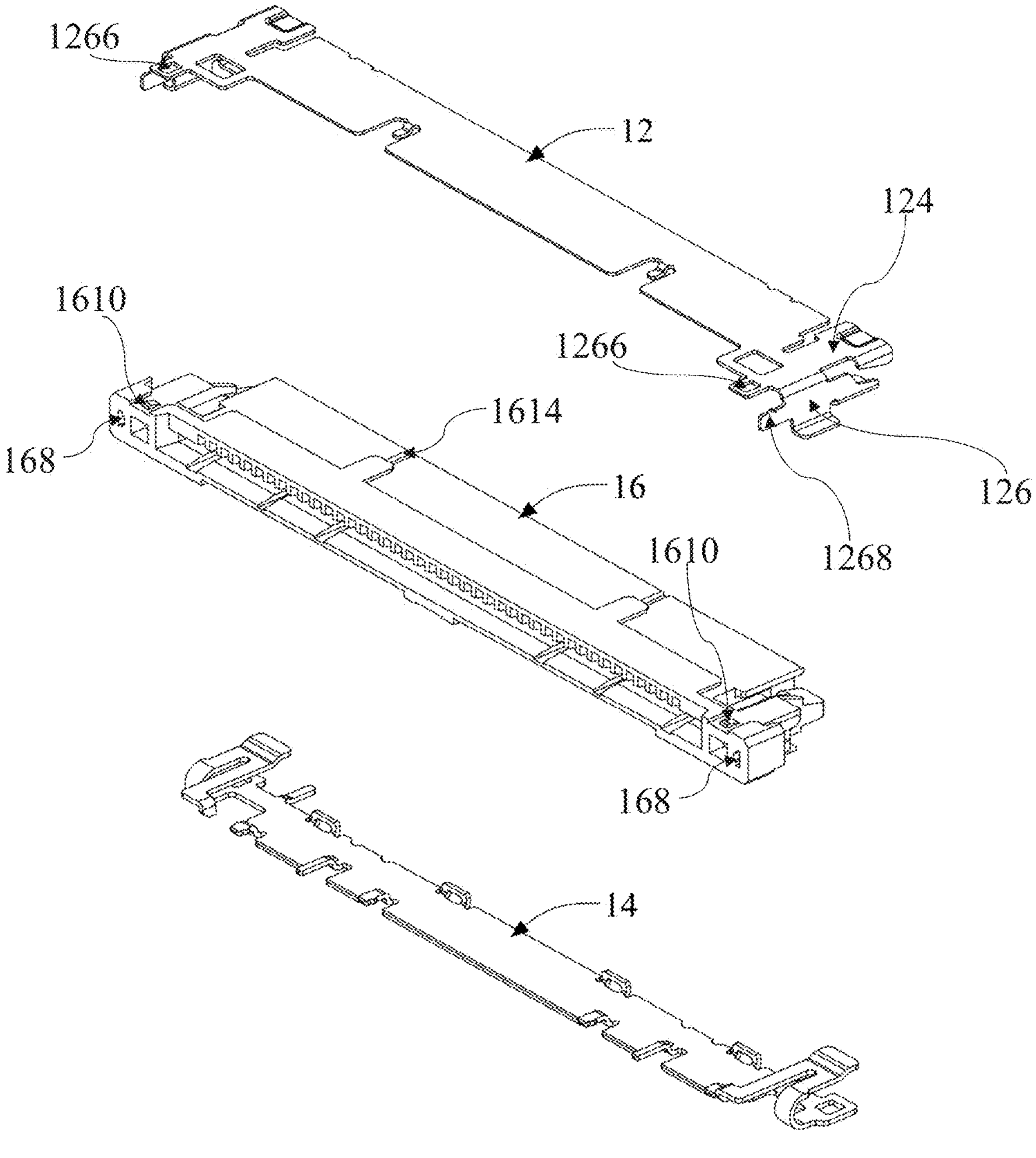
FIG. 2 illustrates an explosion schematic of the thin type lock and unlock connector of the present invention in FIG. 1.

The thin type lock and unlock connector 10 comprises a first shell 12, a second shell 14 and a first insulator 16. Also refer to FIG. 2 illustrating an explosion schematic of the thin type lock and unlock connector of the present invention in FIG. 1. In a second embodiment, thin type lock and unlock connector 10 also may comprises a plurality of terminals 26 illustrated in FIG. 8.

Figure 3A:
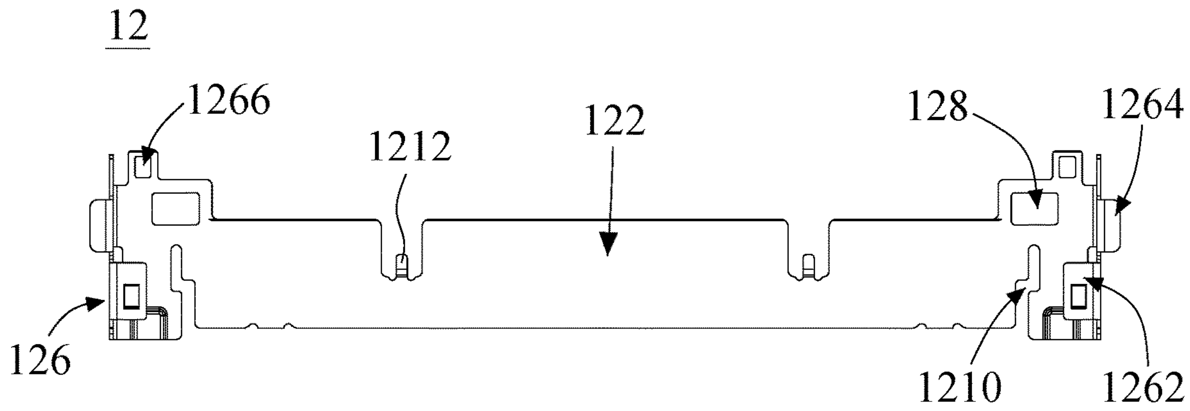
FIG. 3(*a*) illustrates a bottom view of the first shell in FIG. 2 of the present invention.
Figure 3B:
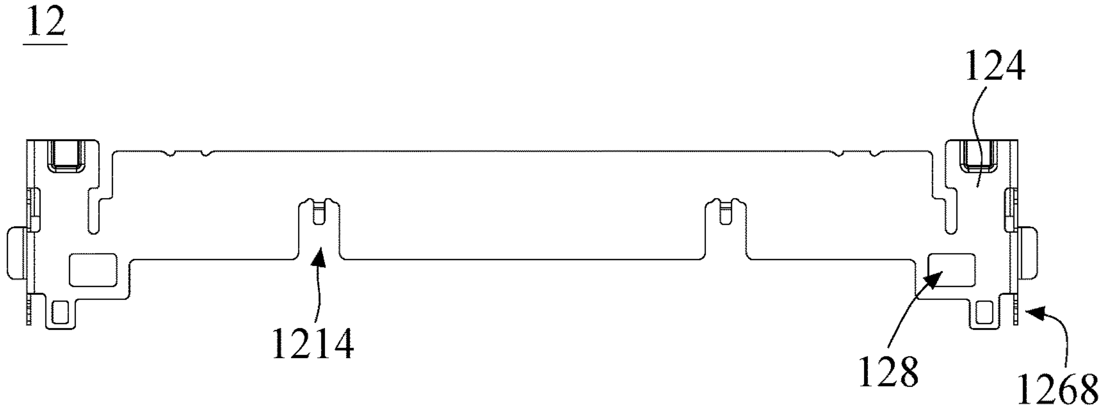
Figure 3C:
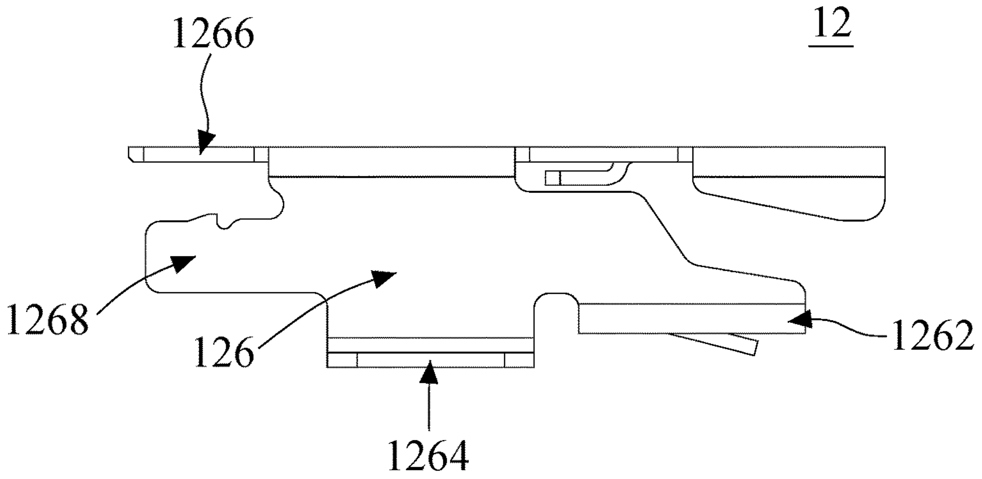

Also refer to FIG. 3(*a*) to FIG. 3(*c*), illustrating a view of the first shell in FIG. 2 of the present invention. FIG. 3(*a*) illustrates a bottom view of the first shell in FIG. 2 of the present invention; FIG. 3(*b*) illustrates a top view of the first shell in FIG. 2 of the present invention; and FIG. 3(*c*) illustrates a side view of the first shell in FIG. 2 of the present invention.

The first shell 12 comprises a first body122, a plurality of first pressing parts 124 and a plurality of first fixing portions 126. Herein, the quantities of the first pressing part 124 and the first fixing portion 126 are two as an example.

The first pressing part 124 and the first fixing portion 126 are respectively arranged on both sides of the first body 122, that is a right side and a left side of FIG. 3(*a*) and FIG. 3(*b*). In FIG. 3(*a*) and FIG. 3(*b*), a first pressing part 124 connects with the first fixing portion 126 and the first body 122.

The first fixing portions 126 respectively provide a first fixing member 1262, a third fixing member 1264 and a fifth fixing member 1266, such that the first fixing portion 126 consists of at least a first fixing member 1262, a third fixing member 1264 and a fifth fixing member 1266. Wherein, the first fixing member 1262 extends forward a direction of the first body 122 (or called inward bending extension) and the third fixing member 1264 extends forward a direction away from the first body 122 (or called outward bending extension), that is, the extension direction of the first fixing member 1262 is opposite to the extension direction of the third fixing member 1264.

In the first embodiment, the first body 122 further comprises a plurality of first openings 128. Herein, the quantity of the first opening 128 is two as an example. The first opening 128 is disposed corresponding to a first locking member 1442 of the second shell 14 as described below. Specially, when a first elastic arm 14422 deforms, the deformation may not act onto the first shell 12 through a bulge of the first opening 128.

In the first embodiment, the first body 122 further comprises a plurality of seventh fixing members 1268. Herein, the quantity of a seventh fixing member 1268 is two as an example. The seventh fixing member 1268 protrudes above a first fixing portion 126 is in a protruding direction, said direction is almost vertical or vertical to the extension direction of the first fixing member 1262 and the third fixing member 1264.

In the first embodiment, a plurality of first gaps 1210 are formed between the first body 122 and a first pressing part 124, so as to partially separate the first body 122 and the first pressing part 124, such that a deformation is easily generated through the first pressing part 124 suffering an external force.

In the first embodiment, the first body 122 forms a positioning opening 1214, for being corresponding to a positioning column 1616 as described below.

Figure 4A:
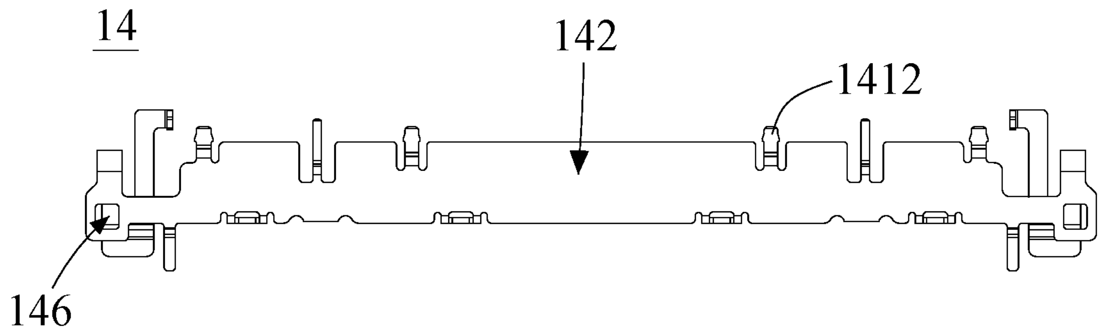
FIG. 4(*a*) illustrates a bottom view of the second shell in FIG. 2 of the present invention.
Figure 4B:
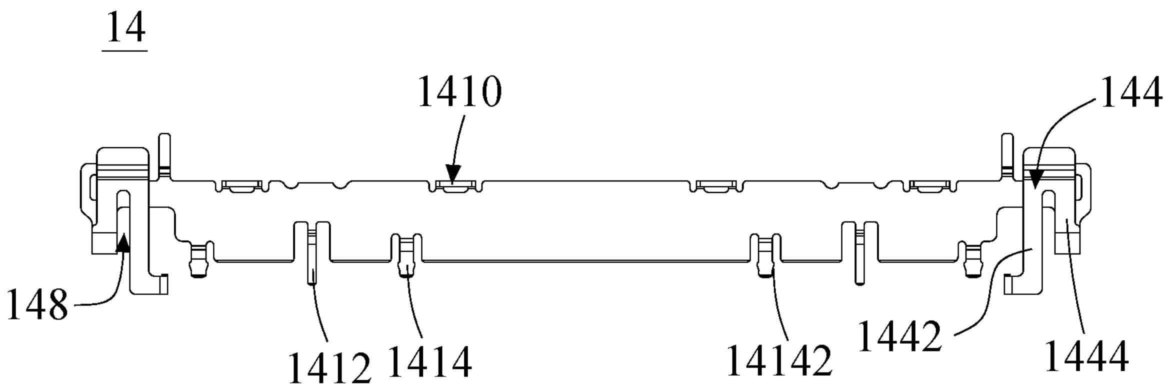
Figure 4C:
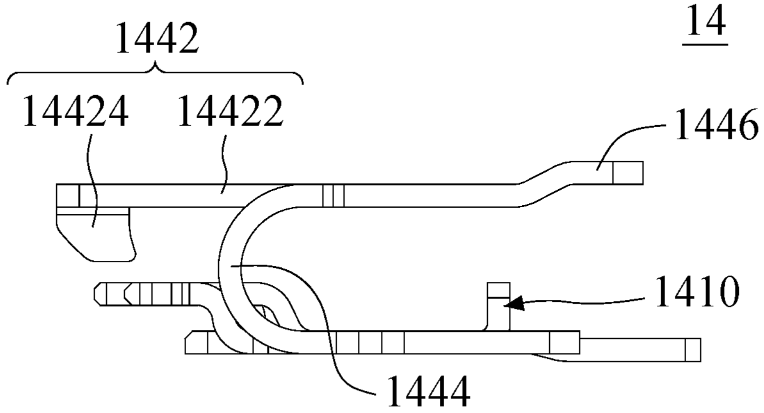
Figure 5A:
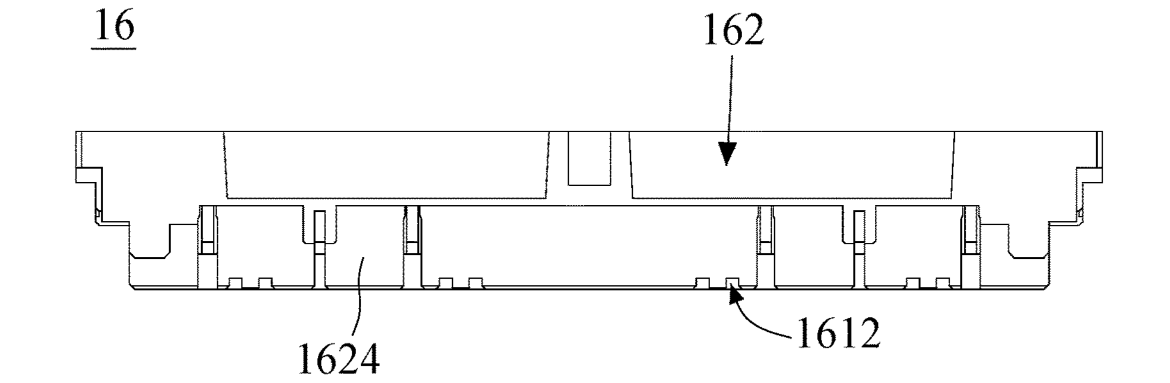
FIG. 5(*a*) illustrates a bottom view of the first insulator in FIG. 2 of the present invention.
Figure 5B:
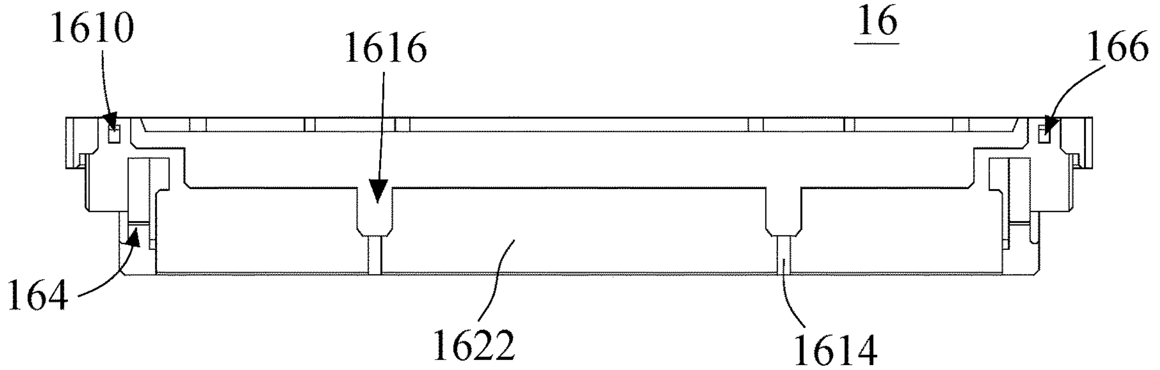
Figure 5C:
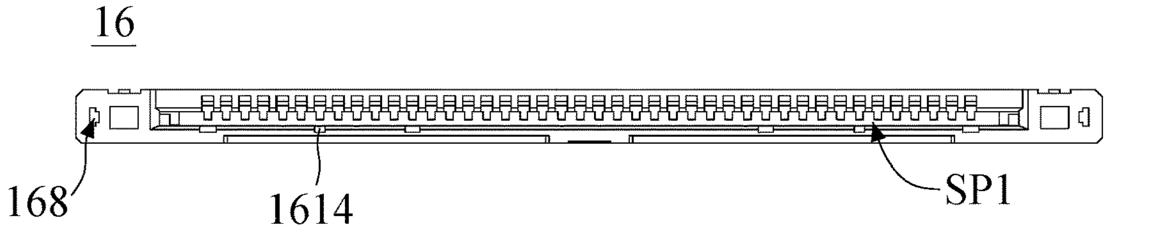
Figure 5D:
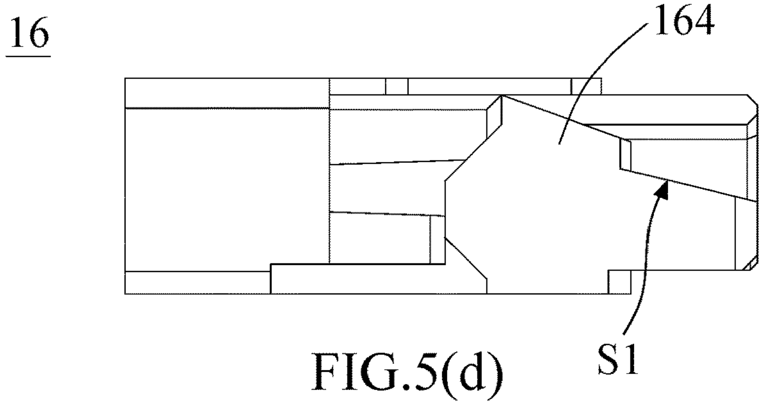

Also refer to FIG. 4(*a*) to FIG. 4(*c*), illustrating a plurality of views of the second shell in FIG. 2 of the present invention. FIG. 4(*a*) illustrates a bottom view of the second shell in FIG. 2 of the present invention; FIG. 4(*b*) illustrates a top view of the second shell in FIG. 2 of the present invention; and FIG. 4(*c*) illustrates a side view of the second shell in FIG. 2 of the present invention.

The second shell 14 comprises a second body 142, a plurality of second pressing parts 144 and a plurality of second fixing members 146. Herein, the quantity of the second pressing part 144 and the second fixing member 146 are both two as an example.

Figure 6:
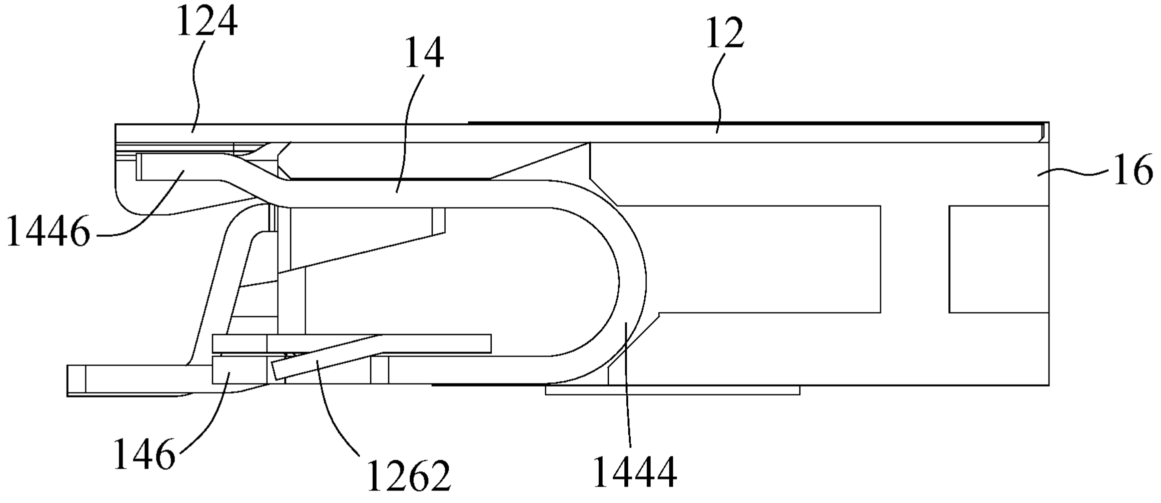
FIG. 6 illustrates a sectional view through line A-A in FIG. 1 of the present invention.

The second pressing part 144 and the second fixing member 146 are respectively arranged on both sides of second body142. The second pressing part 144 connects with the second fixing member 146 and the second body 142. The second pressing part 144 is disposed corresponding to the first pressing part 124. The second pressing part 144 provides a first locking member 1442 and a first elastic member 1444. The second fixing member 146 connects with a first elastic member 1444, and the second fixing member 146 is disposed corresponding to a first fixing member 1262. Also refer to FIG. 6, showing the first fixing member 1262 is stopped by the second fixing member 146 so as to confine the second fixing member 146.

In the first embodiment, the second shell 14 further comprises a plurality of fourth fixing members 1410. Herein, the quantity of a fourth fixing member 1410 is four as an example.

In the first embodiment, the second pressing part 144 forms a plurality of second gaps 148, such that a first locking member 1442 and a first elastic member 1444 are partially separated. Furthermore, each one of the plurality of first locking members 1442 further comprises a first elastic arm 14422 and a first fastening block 14424. Wherein, the first fastening block 14424 protrudes above the first elastic arm 14422, and the first fastening block 14424 is accommodated in the first accommodating space SP1 as described below, so as to be corresponding to a notch (figure not shown) of the flexible printed circuit board (figure not shown). The first elastic arm 14422 is disposed corresponding to a first slope S1. Herein, the first elastic member 1444 is illustrated by a U-shaped element as an example, if an elastic structure is just formed, is belong to an elastic member called in the present invention.

In the first embodiment, the second pressing part 144 further forms a plurality of pressing sheets 1446. The pressing sheet 1446 is disposed corresponding to the first pressing part 124. The pressing sheet 1446 is closer to the first pressing part 124 comparing to the first locking member 1442 and the first elastic member 1444, such that the second pressing part 144 contacts the first pressing part 124 earlier than the first locking member 1442 and the first elastic member 1444.

Also refer to FIG. 5(*a*) to FIG. 5(*d*), illustrating a plurality of views of the first insulator in FIG. 2 of the present invention. FIG. 5(*a*) illustrates a bottom view of the first insulator in FIG. 2 of the present invention; FIG. 5(*b*) illustrates a top view of the first insulator in FIG. 2 of the present invention; and FIG. 5(*c*) illustrates a front view of the first insulator in FIG. 2 of the present invention, and FIG. 5(*d*) illustrates a side view of the first insulator in FIG. 2 of the present invention.

The first insulator 16 comprises a third body 162, a plurality of first action portions 164 and a plurality of sixth fixing members 166. Herein, the quantity of a first action portion164 and a sixth fixing member 166 are two as an example.

The third body 162 provides a first surface 1622, a second surface 1624 and a first accommodating space SP1. The first surface 1622 combines with the first shell 12, and the second surface 1624 combines with a second shell 14.

Figure 11:
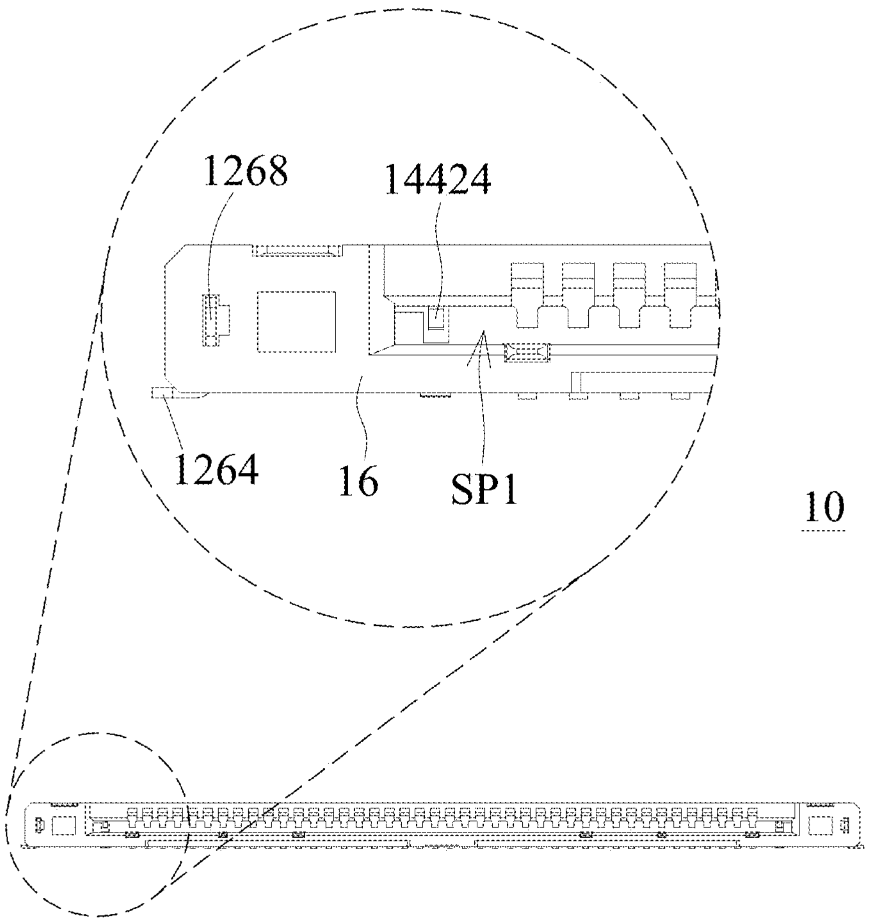
FIG. 11 is a front view of the thin type lock and unlock connector of the first embodiment of the present invention.

The first action portion 164 and the sixth fixing member 166 are respectively arranged on both sides of the third body 162. The first action portion 164 is disposed corresponding to the first locking member 1442, and the first accommodating space SP1 accommodates a portion (i.e., the first fastening block 14424) of the first locking member 1442 as shown in FIG. 11 which is a front view of the thin type lock and unlock connector of the first embodiment. The first action portion 164 respectively forms the first slope S1 so as to determine a deformation stroke of the first locking member 1442, such that the first locking member 1442 is stopped by the first slope S1, furthermore the sixth fixing member 166 is disposed corresponding to fifth fixing member 1266.

In the first embodiment, the third body 162 further comprises a plurality of second openings 168. The seventh fixing member 1268 is disposed corresponding to second opening 168. Furthermore, the seventh fixing member 1268 combines with the second opening 168, such that the first shell 12 is confined in third body 162.

In the first embodiment, the third body 162 further comprises formed a plurality of first recess 1610. Herein, the quantity of a first recess 1610 is two as an example. The first recess 1610 combines with the fifth fixing member 1266, so as to confine the fifth fixing member 1266 in the third body 162.

In the first embodiment, the first insulator 16 further comprises a plurality of eighth fixing members 1612. Herein, the quantity of the eighth fixing member 1612 is four as an example. The eighth fixing member 1612 is disposed corresponding to the fourth fixing member 1410, so as to confine the second shell 14 in the first insulator 16.

In the first embodiment, the third body162 further comprises a formed positioning column 1616, is disposed corresponding to a positioning opening 1214 of the first shell 12. Through inserting the positioning column 1616 into the positioning opening 1214, so as to confine the first shell 12 in the first insulator 16.

Also refer to FIG. 6, showing a sectional view through line A-A in FIG. 1 of the present invention. In FIG. 6, according to the first shell 12, the second shell 14 and the first insulator 16 as mentioned above, it is known that through the combination between the first fixing member 1262, the second fixing member 146, the fifth fixing member 1266, the sixth fixing member 166 and the first elastic member 1444, such that the first shell 12, the second shell 14 and the first insulator 16 are buckled and combined with each other.

The first pressing part 124 is suffered an external force to forward a first direction, for example, the FIG. 3(*c*) as an example, the first direction is a −Y axis (the figure faces down) direction. After a deformation of the first pressing part 124, the first elastic member 1444 is suffered a deformation of the first pressing part 124 to further drive the first locking member 1442 to deform forward the second direction. For example, the FIG. 4(*c*) as an example, a second direction is a direction of +Y axis (the figure faces up), such that after occurring a deformation of the first locking member 1442, the deformation unlocks the flexible printed circuit board (FIGURE not shown) located in the first accommodating space SP1, and when a deformation of the first elastic member 1444 occurs, the first locking member 1442 locks the flexible printed circuit board in the first accommodating space SP1.

Figure 7:
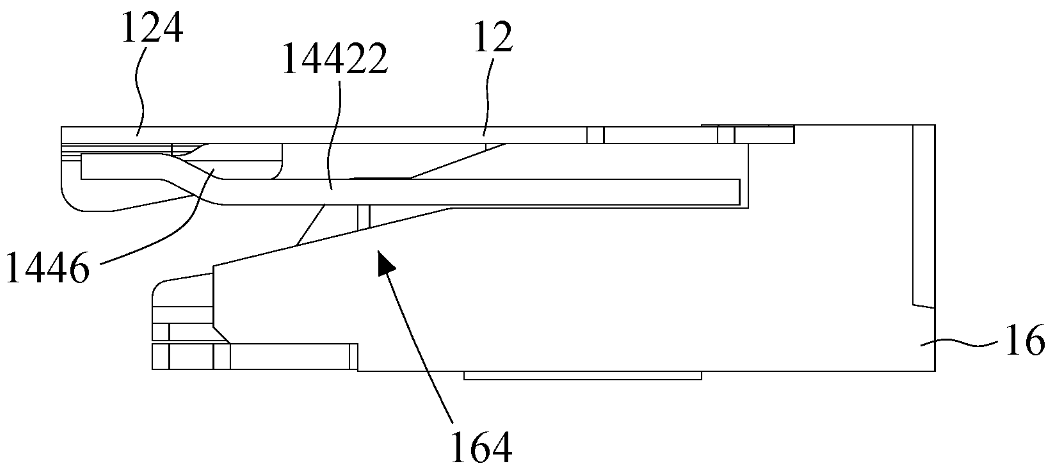
FIG. 7 illustrates another sectional view through line B-B in FIG. 1 of the present invention.

Also refer to FIG. 7, illustrating a sectional view through line B-B in FIG. 1 of the present invention. In FIG. 7, the first action portion 164 is showing as a structure of the first slope S1, such that first pressing part 124 applying an external force to the first shell 12, i.e. the external force along a direction face down in the figure is applied to the first pressing part 124, the first pressing part 124 intermediately presses pressing sheet 1446 resulting in a deformation of the first elastic member 1444, further drive the first locking member 1442 to deform. Wherein, a deformation stroke of deformation of the first locking member 1442 is stopped by the first slope S1.

Return to FIG. 3(*b*) and FIG. 4(*c*), after the first locking member 1442 deforming forward the second direction, at least a portion of the first locking member 1442 protrude above the first opening 128 located in the first shell 12 as mentioned above. Through a structure of the first opening 128, an objective for thinning the connector can be achieved.

In the first embodiment, at least one of the first shell 12 and the second shell 14 further comprises a plurality of ground electrodes 1212, 1412 and a plurality of second recesses 1614 formed in the first accommodating space SP1 of the third body 162, a quantity of the second recess 1614 is equal to or more than a quantity of the ground electrode 1212, 1412. The ground electrode 1212, 1412 are disposed corresponding to second recess 1614, and the ground electrode 1212, 1412 is disposed in the second recess 1614.

In the first embodiment, the second shell 14 as mentioned above further comprises a buckling member 1414, and the third body 162 further comprises slot 1626, By combining the buckling member 1414 with the slot 1626, the second shell 14 is buckled on the third body162. Wherein, a bump 14142 is formed on both sides of the buckling member 14142, such that the buckling member 1414 is buckled on the slot 1626, and through the slot 1626 buckled on the bump 14142.

Figure 8:
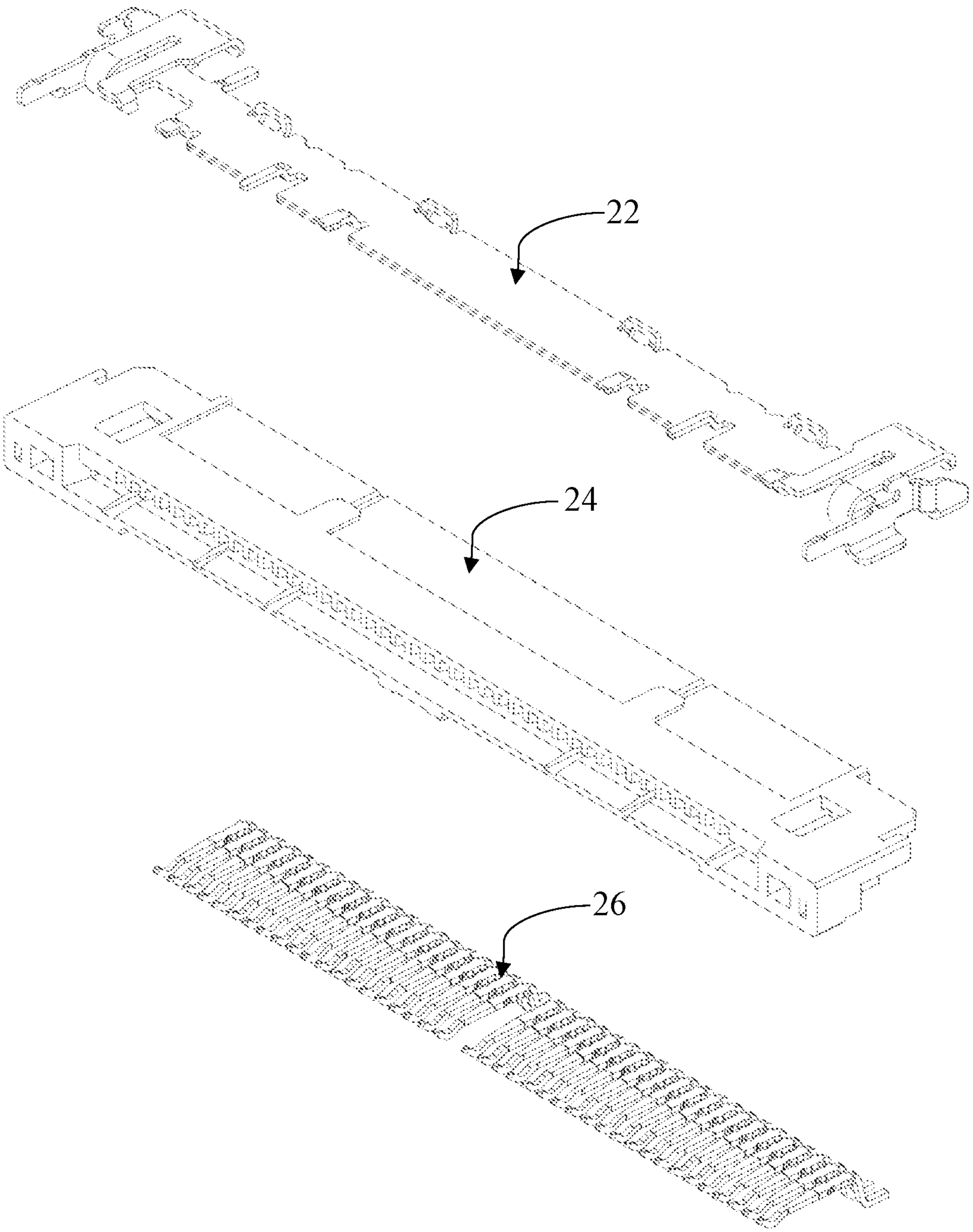
FIG. 8, illustrates an explosion schematic of the thin type lock and unlock connector according to the second embodiment of the present invention.

Please refer to FIG. 8, illustrating an explosion schematic of the thin type lock and unlock connector according to the second embodiment of the present invention. In FIG. 8, thin type lock and unlock connector 20 similarly connects with a flexible printed circuit board. Differing from the present embodiment, an architecture of two shells in the first embodiment is changed to an architecture of one shell.

The thin type lock and unlock connector 20 comprises a fifth shell 22 and a second insulator 24. The thin type lock and unlock connector 20 also further comprises a plurality of terminals 26.

Figure 9A:
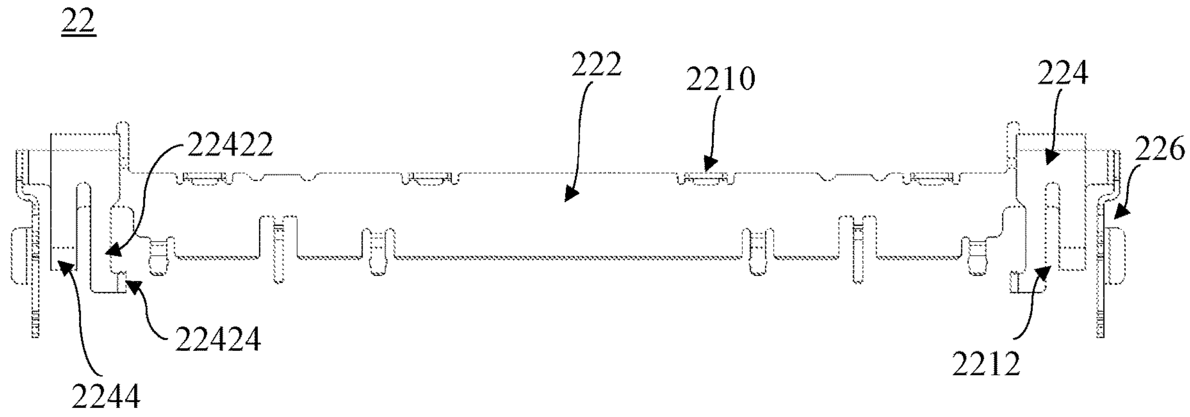
FIG. 9(*a*) illustrates a bottom view of the fifth shell in FIG. 8 of the present invention.
Figure 9B:
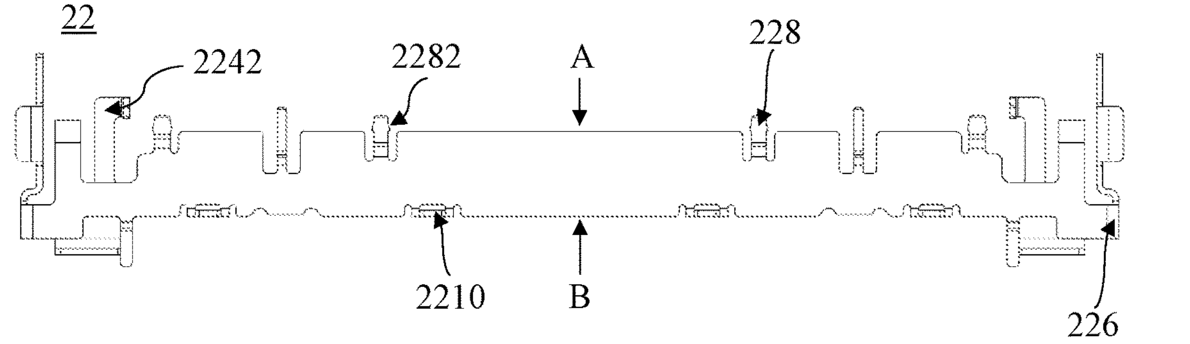
Figure 9C:
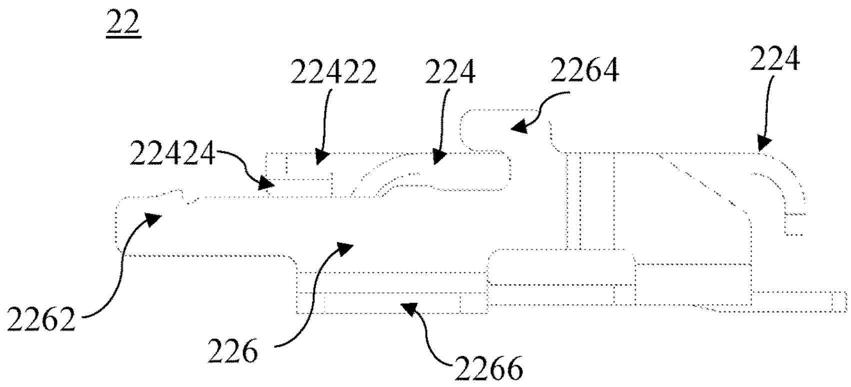
Figure 10A:
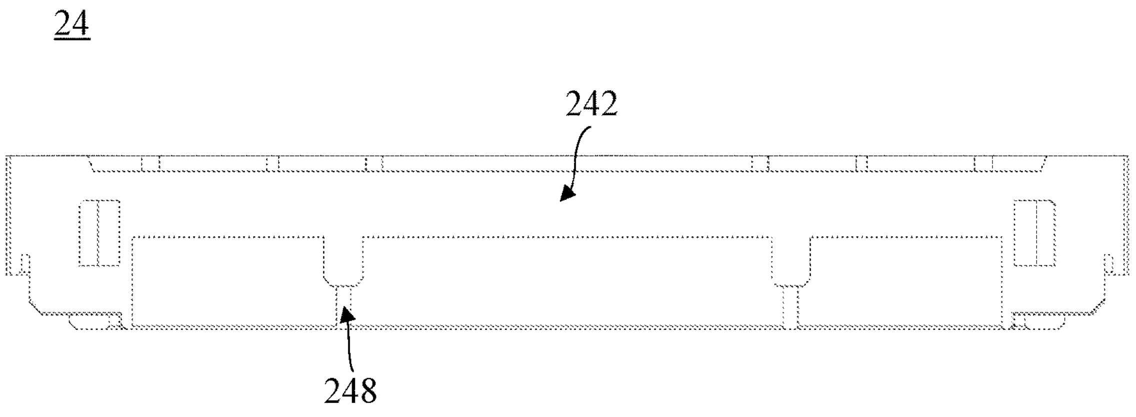
FIG. 10(*a*) illustrates a top view of the second insulator in FIG. 8 of the present invention.
Figure 10B:
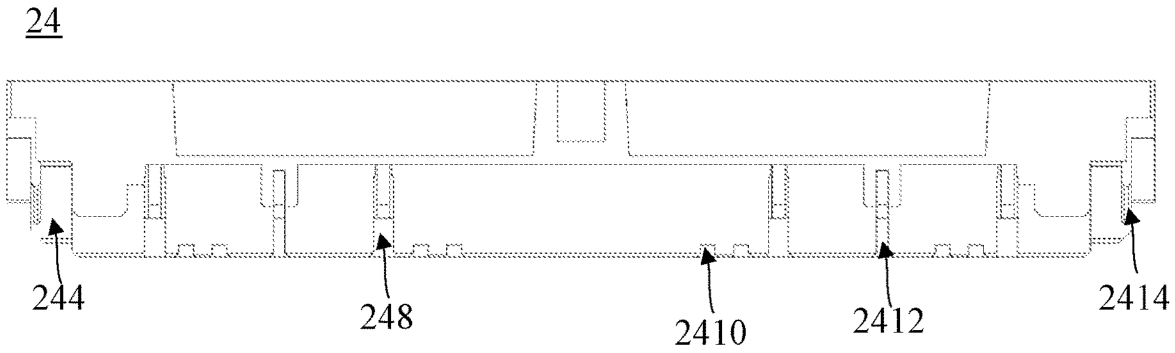
Figure 10C:
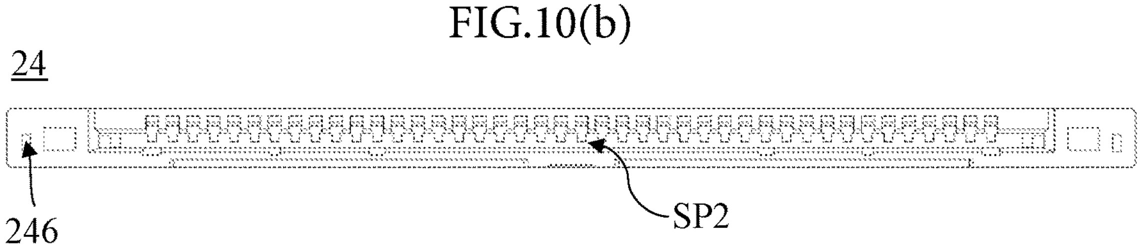
Figure 10D:
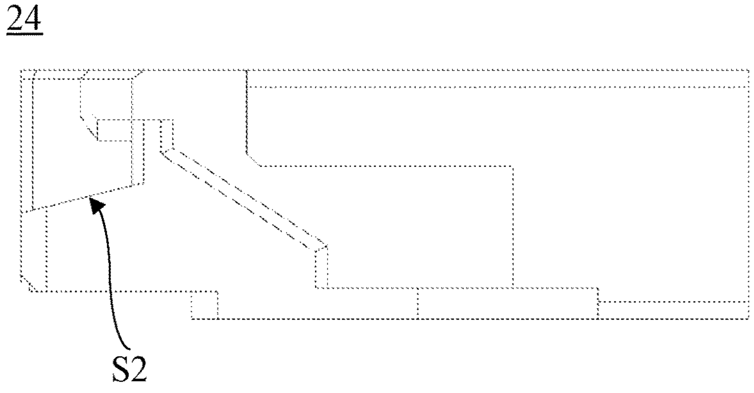

Also refer to FIG. 9(*a*) to FIG. 9(*c*), illustrating a plurality of views of a fifth shell in FIG. 8 of the present invention. FIG. 9(*a*) illustrates a bottom view of the fifth shell in FIG. 8 of the present invention; FIG. 9(*b*) illustrates a top view of the fifth shell in FIG. 8 of the present invention; and FIG. 9(*c*) illustrates a side view of the fifth shell in FIG. 8 of the present invention.

The fifth shell 22 comprises a fifth body 222, a plurality of fifth pressing parts 224, a plurality of ninth fixing members 226, a plurality of eleventh fixing members 228 and a plurality of thirteenth fixing members 2210. Herein, the quantities of the fifth pressing part 224, the ninth fixing member 226, the eleventh fixing member 228 and the thirteenth fixing member 2210 are two as an example.

The fifth pressing part 224 and the ninth fixing member 226 are arranged on both sides of the fifth body 222. Herein, the ninth fixing member 226 may be consisted of the first pin 2262, the second pin 2264 and the ground member 2266. Wherein, the first pin 2262 is formed on the leading end of ninth fixing member 226 corresponding to a fourth opening 246 as described below, the second pin 2264 is formed on an upper side of the ninth fixing member 226, and the ground member 2266 is formed on a lateral side for providing a connection of a printing circuit board (figure not shown). An eleventh fixing member 228 is disposed on the leading edge A of the fifth body 222, and a thirteenth fixing member 2210 is disposed on a trailing edge B of the fifth body 222. Herein, a bump 2282 is formed on both sides of the leading edge of the eleventh fixing member 228, so as to buckle a twelfth fixing member 248 as described below, i.e. the eleventh fixing member 228 is buckled on the twelfth fixing member 248 by the bump 2282. Wherein, the leading edge A and the trailing edge B are located at a corresponding side. The fifth pressing part 224 connects with the ninth fixing member 226 and the fifth body 222. The fifth pressing part 224 provides a second locking member 2242 and a second elastic member 2244. The ninth fixing member 226 connects with a second elastic member 2244.

In the second embodiment, the fifth pressing part 224 forms a plurality of fourth gaps 2212, for partially separating the second locking member 2242 and the second elastic member 2244, furthermore each one of the plurality of second locking members 2242 further comprises a second elastic arm 22422 and a second fastening block 22424. The second fastening block 22424 protrudes above the second elastic arm 22422, and the second fastening block 22424 is accommodated in the second accommodating space SP2 as described below so as to be capable of being corresponding to the notch of the flexible printed circuit board. Furthermore, the second elastic arm 22422 is disposed corresponding to a second slope, so as to stop deformed the second elastic arm 22422.

Also refer to FIG. 10(*a*) to FIG. 10(*d*), illustrating a plurality of views of a second insulator in FIG. 8 of the present invention. FIG. 10(*a*) illustrates a top view of the second insulator in FIG. 8 of the present invention; FIG. 10(*b*) illustrates a bottom view of the second insulator in FIG. 8 of the present invention; FIG. 10(*c*) illustrates a front view of second insulator in FIG. 8 of the present invention; and FIG. 10(*d*) illustrates a side view of second insulator in FIG. 8 of the present invention.

The second insulator 24 comprises a seventh body 242, a plurality of second action portions 244, a plurality of fourth openings 246, a plurality of twelfth fixing members 248 and a plurality of fourteenth fixing members 2410. Herein, the quantities of the second action portion244, the fourth opening 246, the twelfth fixing member 248 and the fourteenth fixing member 2410 are two as an example, and the quantities of the second action portions 244, the plurality of fourth openings 246, the plurality of twelfth fixing members 248 and the plurality of fourteenth fixing members 2410 are equal to or more than the quantities of the fifth pressing part 224, the ninth fixing member 226, the eleventh fixing member 228 and the thirteenth fixing member 2210.

Figure 12:
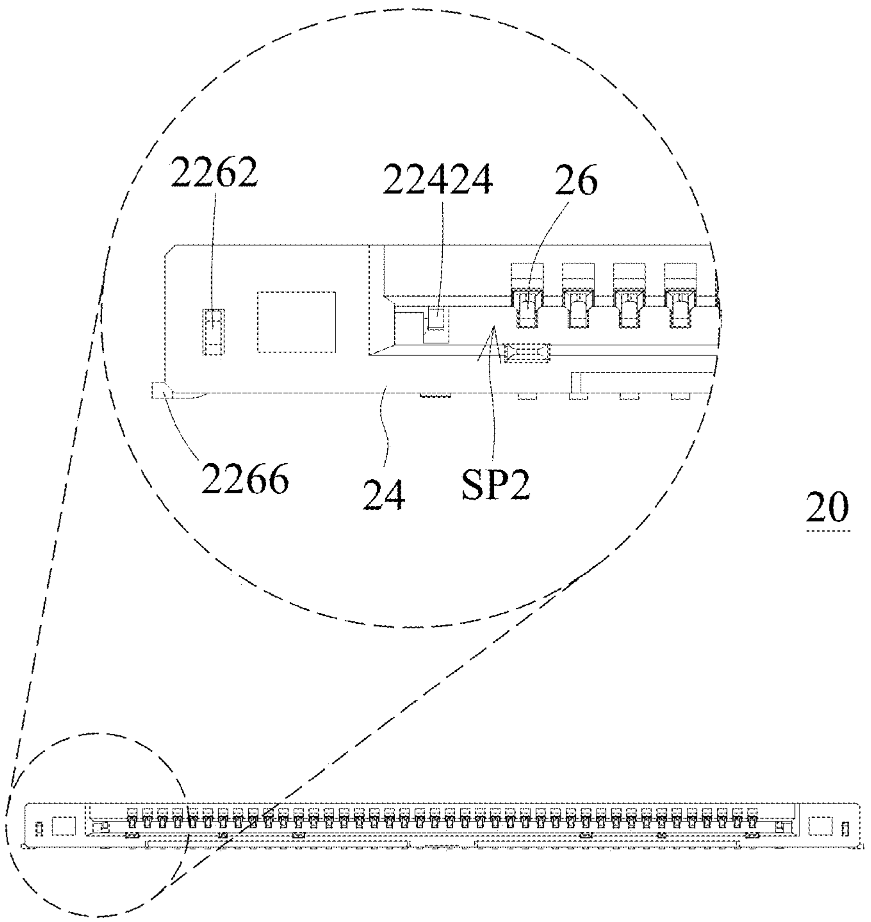
FIG. 12 is a front view of the thin type lock and unlock connector of the second embodiment of the present invention.

The seventh body 242 provides a second accommodating space SP2. The second action portion 244 is arranged on both sides of the seventh body 242. The second action portion 244 is disposed corresponding to the second locking member 2242, and the second accommodating space SP2 accommodates a portion (i.e., the second fastening block 22424) of the second locking member 2242 as shown in FIG. 12 which is a front view of the thin type lock and unlock connector of the second embodiment. The second action portion 244 forms the second slope S2 so as to determine a deformation stroke of the second locking member 2242, such that the second locking member 2242 is stopped by the second slope S2. The fourth opening 246 is disposed corresponding to the ninth fixing member 226. The twelfth fixing member 248 is disposed corresponding to the eleventh fixing member 228. The fourteenth fixing member 2410 is disposed corresponding to the thirteenth fixing member 2210.

In the second embodiment, the seventh body 242 may further comprise a socket 2414 corresponding to a second pin 2264, so as to confine the fifth shell 22 in a second insulator 24.

Wherein, through a combination between the ninth fixing member 226, the eleventh fixing member 228, the thirteenth fixing member 2210, the fourth opening 246, the twelfth fixing member 248 and the fourteenth fixing member 2410, such that the fifth shell 22 is buckled and combined with the second insulator 24 each other. Furthermore, after the fifth pressing part 224 is suffer an external force to be deformed forward the first direction, the second elastic member 2244 is suffered a deformation of the fifth pressing part 224 to further drive the second locking member 2242 deform forward the second direction deformation, such that the flexible printed circuit board located in the second accommodating space SP2 is unlocked, and when a deformation of the second elastic member 2244 does not occurred, the second locking member 2242 will lock the flexible printed circuit board in the second accommodating space SP2.

Furthermore, in the second embodiment, the fifth shell 22 mentioned above may provide a plurality of ground electrodes 2214 and a plurality of fourth recess 2412 formed in the second accommodating space SP2 of the seventh body 242 mentioned above, Herein, the quantities of the ground electrode 2214 and the fourth recess 2412 are two as an example. The ground electrode 2214 is disposed corresponding to the fourth recess 2412, and the ground electrode 2214 is disposed in the fourth recess 2412. Wherein, the ground electrode 2214 is formed in the fifth body222.

The present invention is disclosed by the preferred embodiment in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A thin type lock and unlock connector, the thin type lock and unlock connector comprising:

a first shell with a first body, a plurality of first pressing parts and a plurality of first fixing portions, the plurality of first pressing parts and the plurality of first fixing portions are respectively arranged on both sides of the first body, the plurality of first pressing parts are connected with the plurality of first fixing portions and the first body, the plurality of first fixing portions respectively provide a first fixing member, a third fixing member and a fifth fixing member, the first fixing member extends to a direction of the first body, and the third fixing member extends to a direction away from the first body;

a second shell with a second body, a plurality of second pressing parts and a plurality of second fixing members, the plurality of second pressing parts and the plurality of second fixing members are respectively arranged on both sides of the second body, the plurality of second pressing parts are connected with the plurality of second fixing members and the second body, the plurality of second pressing parts are disposed corresponding to the plurality of first pressing parts, the plurality of second pressing parts respectively provide a first locking member and a first elastic member, the plurality of second fixing members are connected with the plurality of first elastic members, and the plurality of second fixing members are disposed corresponding to the plurality of first fixing members; and a first insulator with a third body, a plurality of first action portions and a plurality of sixth fixing members, the third body provides a first surface, a second surface and a first accommodating space corresponding to each other, the first surface is combined with the first shell and the second surface is combined with the second shell, the plurality of first action portions and the plurality of sixth fixing members are respectively arranged on both sides of the third body, the plurality of first action portions are disposed corresponding to the plurality of first locking members, and the first accommodating space accommodates a portion of the plurality of first locking members, the plurality of first action portions respectively form a first slope, such that the plurality of first locking members are stopped by the first slope, furthermore the plurality of sixth fixing members are corresponding to the plurality of fifth fixing members;

wherein, through a combination between the plurality of first fixing members, the plurality of second fixing members, the plurality of fifth fixing members, the plurality of sixth fixing members and the plurality of first elastic members, such that the first shell, the second shell and the first insulator are buckled and combined with each other, furthermore, after the plurality of first pressing parts are suffered from an external force and deformed forward a first direction, the plurality of first elastic members are suffered from the deformation of the plurality of first pressing parts and further drive the plurality of first locking members to deform forward a second direction;

wherein a plurality of first gaps are formed between the first body and the plurality of first pressing parts, such that the first body and the plurality of first pressing parts are partially separated for generating a deformation resulted from the plurality of first pressing parts are suffered from the external force.

2. The thin type lock and unlock connector of claim 1, wherein the first body further comprises a plurality of first openings, the plurality of first openings are disposed corresponding to the plurality of first locking members, at least a portion of the plurality of first locking members protrude above the plurality of first openings.

3. The thin type lock and unlock connector of claim 1, wherein the plurality of first fixing portions further comprise a plurality of seventh fixing members, and the third body further comprises a plurality of second openings, the plurality of seventh fixing members are disposed corresponding to the plurality of second openings.

4. The thin type lock and unlock connector of claim 1, wherein the third body further comprises a plurality of first recesses formed and combined with the plurality of fifth fixing members, such that the plurality of fifth fixing members are confined in the third body.

5. The thin type lock and unlock connector of claim 1, wherein the second shell further comprises a plurality of fourth fixing members, and the first insulator further comprises a plurality of eighth fixing members, the plurality of fourth fixing members are disposed corresponding to the plurality of eighth fixing members, such that the second shell is confined in the first insulator.

6. The thin type lock and unlock connector of claim 1, wherein at least one of the first shell and the second shell further comprises a plurality of ground electrodes, and a plurality of second recesses formed in the first accommodating space of the third body, the plurality of ground electrodes are disposed corresponding to the plurality of second recesses, and the plurality of ground electrodes are disposed in the plurality of second recesses, wherein the plurality of ground electrodes are formed in at least one of the first body and the second body.

7. The thin type lock and unlock connector of claim 1, wherein the first body further comprises formed a positioning opening, and the third body further comprises formed a positioning column, the positioning opening is disposed corresponding to the positioning column, such that the first shell is confined in the first insulator.

8. The thin type lock and unlock connector of claim 1, wherein the second shell further comprises a plurality of tenth fixing members, and the first insulator further comprises a plurality of twelfth fixing members, the plurality of tenth fixing members are disposed corresponding to the plurality of twelfth fixing members, the plurality of tenth fixing members are disposed at a leading edge of the second shell, such that the second shell is confined in the first insulator.

9. The thin type lock and unlock connector of claim 1, wherein the plurality of second pressing parts form a plurality of second gaps, such that the plurality of first locking members and the plurality of first elastic members are partially separated, furthermore each one of the plurality of first locking members further comprise a first elastic arm and a first fastening block, the first fastening block protrudes from the first elastic arm.

10. The thin type lock and unlock connector of claim 9, wherein the plurality of second pressing parts further form a plurality of pressing sheets disposed corresponding to the plurality of first pressing parts.

11. A thin type lock and unlock connector, the thin type lock and unlock connector comprising:

a fifth shell with a fifth body, a plurality of fifth pressing parts, a plurality of ninth fixing members, a plurality of eleventh fixing members and a plurality of thirteenth fixing members, the plurality of fifth pressing parts and the plurality of ninth fixing members are arranged on both sides of the fifth body, the plurality of eleventh fixing members are disposed in a leading edge of the fifth body, and the plurality of thirteenth fixing members are disposed in a trailing edge of the fifth body, the plurality of fifth pressing parts are connected with the plurality of ninth fixing members and the fifth body, the plurality of fifth pressing parts respectively provides a second locking member and a second elastic member, the plurality of ninth fixing members are connected with the plurality of second elastic members; and a second insulator with a seventh body, a plurality of second action portions, a plurality of fourth openings, a plurality of twelfth fixing members and a plurality of fourteenth fixing members, the seventh body provides a second accommodating space, the plurality of second action portions are arranged on both sides of the seventh body, the plurality of second action portions are disposed corresponding to the plurality of second locking members, and the second accommodating space accommodates a portion of the plurality of second locking members, the plurality of second action portions respectively form a second slope, such that the plurality of second locking members are stopped by the second slope, the plurality of fourth openings are disposed corresponding to the plurality of ninth fixing members, the plurality of twelfth fixing members are disposed corresponding to the plurality of eleventh fixing members, the plurality of fourteenth fixing members are disposed corresponding to the plurality of thirteenth fixing members;

wherein, through a combination between the plurality of ninth fixing members, the plurality of eleventh fixing members, the plurality of thirteenth fixing members, the plurality of fourth openings, the plurality of twelfth fixing members and the plurality of fourteenth fixing members, such that the fifth shell and the second insulator are buckled and combined with each other, furthermore, after the plurality of fifth pressing parts are suffered from an external force and deformed forward a first direction, the plurality of second elastic members are suffered from the deformation of the plurality of fifth pressing parts and further drive the plurality of second locking members to deform forward a second direction;

wherein the plurality of fifth pressing parts form a plurality of fourth gaps, in order to partially separate the plurality of second locking members and the plurality of second elastic members, furthermore each one of the plurality of second locking members further comprises a second elastic arm and a second fastening block, the second fastening block protrudes from the second elastic arm, the second elastic arm is disposed corresponding to the first slope.

12. The thin type lock and unlock connector of claim 11, wherein the fifth shell further comprises provided a plurality of ground electrodes, and the second accommodating space of the seventh body further comprises formed a plurality of fourth recesses, the plurality of ground electrodes are disposed corresponding to the plurality of fourth recesses, and the plurality of ground electrodes are disposed in the plurality of fourth recesses, wherein the plurality of ground electrodes are formed in the fifth body.

13. The thin type lock and unlock connector of claim 11, wherein each one of the plurality of ninth fixing members further comprise a first pin, a second pin and a ground member, the first pin is formed in the leading edge of the ninth fixing member, and the first pin is corresponding to the fourth opening, the second pin is formed on an upper side of the ninth fixing member, and the ground member is provided for being formed on a lateral side of the ninth fixing member.

* * * * *